(12) United States Patent
Verliefde et al.

(10) Patent No.: US 11,577,959 B2
(45) Date of Patent: *Feb. 14, 2023

(54) METHOD FOR RECOVERING N, K, AND P FROM LIQUID WASTE STREAM

(71) Applicant: Universiteit Gent, Ghent (BE)

(72) Inventors: Arne Verliefde, Meigem (BE); Sebastiaan Derese, Gentbrugge (BE)

(73) Assignee: Universiteit Gent, Ghent (BE)

( * ) Notice: Subject to any disclaimer, the term of this patent is extended or adjusted under 35 U.S.C. 154(b) by 584 days.

This patent is subject to a terminal disclaimer.

(21) Appl. No.: 16/499,925

(22) PCT Filed: Mar. 30, 2018

(86) PCT No.: PCT/EP2018/058285
§ 371 (c)(1),
(2) Date: Oct. 1, 2019

(87) PCT Pub. No.: WO2018/185025
PCT Pub. Date: Oct. 11, 2018

(65) Prior Publication Data
US 2021/0114879 A1 Apr. 22, 2021

(30) Foreign Application Priority Data
Apr. 6, 2017 (EP) .................................... 17165172

(51) Int. Cl.
*C01B 25/45* (2006.01)
*C02F 1/44* (2006.01)
(Continued)

(52) U.S. Cl.
CPC .............. *C01B 25/45* (2013.01); *C02F 1/445* (2013.01); *C02F 1/5254* (2013.01);
(Continued)

(58) Field of Classification Search
CPC ........ C01B 25/45; C02F 1/445; C02F 1/5254; C02F 2001/5218; C02F 2101/105;
(Continued)

(56) References Cited

U.S. PATENT DOCUMENTS 4,477,355 A * 10/1984 Liberti .................... B01J 49/08
210/906
2002/0124613 A1 9/2002 Sower
(Continued)

FOREIGN PATENT DOCUMENTS

CN 105271625 A 1/2016
EP 0335280 A1 * 10/1989 ................ C02F 1/52
(Continued)

OTHER PUBLICATIONS

Translation of WO_2015162163_A1_M.pdf (Year: 2015).*
PCT International Search Report and Written Opinion dated May 23, 2018 in connection with PCT International Application No. PCT/EP2018/058285.

*Primary Examiner* — Nam X Nguyen
*Assistant Examiner* — Ekandra S. Miller-Cruz
(74) *Attorney, Agent, or Firm* — Amster, Rothstein & Ebenstein LLP

(57) ABSTRACT

The present invention relates to a method for recovering N, K, and P from liquid waste stream, preferably from a stream of urine, or from a stream comprising excreta (e.g. faeces, manure, digestate, fertilizer), or from (concentrated) wastewater, for example, municipal (e.g. sewage, septic) and/or industrial wastewater (e.g. food and feed industry, agriculture, mining, etc.); more preferably from urine, such as human or animal urine; most preferably from human urine.

12 Claims, 7 Drawing Sheets

(51) Int. Cl.
*C02F 1/52* (2006.01)
*C02F 101/10* (2006.01)
*C02F 101/16* (2006.01)
*C02F 103/00* (2006.01)
*C02F 103/20* (2006.01)

(52) U.S. Cl.
CPC ............... *C02F 2001/5218* (2013.01); *C02F 2101/105* (2013.01); *C02F 2101/16* (2013.01); *C02F 2103/005* (2013.01); *C02F 2103/20* (2013.01)

(58) Field of Classification Search
CPC ............ C02F 2101/16; C02F 2103/005; C02F 2103/20; C02F 2101/166; C02F 2103/10; C02F 2103/32; C02F 1/447; C02F 1/04; C02F 1/441; C02F 1/442; C02F 1/66; C02F 2101/163; Y02W 10/37
USPC ......... 423/184; 210/669, 687, 700, 734, 735
See application file for complete search history.

(56) References Cited

U.S. PATENT DOCUMENTS

| | | | |
|---|---|---|---|
| 2010/0322839 A1* | 12/2010 | Chung | C02F 1/5254 423/302 |
| 2012/0074058 A1 | 3/2012 | Zeng et al. | |
| 2014/0116939 A1 | 5/2014 | Chen et al. | |
| 2015/0336830 A1 | 11/2015 | Burke | |

FOREIGN PATENT DOCUMENTS

| | | | | |
|---|---|---|---|---|
| EP | 1849751 A1 * | 1/2006 | | C02F 11/04 |
| EP | 2904892 A1 * | 2/2014 | | C02F 1/52 |
| WO | 2012040848 A1 | 4/2012 | | |
| WO | 2012163085 A1 | 12/2012 | | |
| WO | WO-2014177156 A1 * | 5/2014 | | C12P 5/00 |
| WO | WO-2015162163 A1 * | 4/2015 | | C01C 1/242 |

* cited by examiner

METHOD FOR RECOVERING N, K, AND P FROM LIQUID WASTE STREAM

CROSS-REFERENCE TO RELATED APPLICATIONS

This application is a U.S. national phase of PCT International Patent Application No. PCT/EP2018/058285, filed Mar. 30, 2018, which claims priority to European Patent Application No. 17165172.2, filed Apr. 6, 2017, the contents of which are hereby incorporated by reference.

FIELD OF THE INVENTION

The present invention relates to a method for recovering N, K, and P from a liquid waste stream; preferably from a stream of urine, or from a stream comprising excreta (e.g. faeces, manure, digestate, fertilizer), or from (concentrated) wastewater, for example, municipal (e.g. sewage, septic) and/or industrial wastewater (e.g. food and feed industry, agriculture, mining, etc.); more preferably from a stream of urine, such as human or animal urine; most preferably from human urine.

BACKGROUND OF THE INVENTION

Nitrogen (N), phosphorus (P), and potassium (K) are essential elements for all living organisms, plants and animals alike. Even though they appear to be rather abundant, the occurrence of exploitable deposits in terms of quality and accessibility is limited to only a few places. For instance, a small number of countries control more than 70% of the global phosphate reserves, which are expected to peak in less than 50 years at current growing consumption rates. Given that phosphorus cannot be substituted by alternative resources, it may well become a future strategic resource.

These elements (i.e. N, P, and K) typically enter the food chain after being taken up by plants, to be eventually discharged as waste from the animal and human body. Importantly, the waste contains various amounts of said elements as usually assimilation accounts for <1%, thus forming a significant natural resource for extraction as fertilizing component. Human urine in particular is a key source containing a significant amount of inorganic and organic compounds, for example those containing N (e.g. urea, Uric acid, ammonium) and P (e.g. phosphates), and also dissolved ions (e.g. $K^+$, $Na^+$, $Cl^-$, $Mg^{2+}$, $Ca^{2+}$). With the introduction of general sanitation, however, human waste is directly disposed of into water bodies and the increased dilution renders the valuable fertilizing components of sewage practically worthless.

Several nutrient removal and recovery technologies are known to extract resources from wastewater or from urine in particular. However, these are often chemically, energetically and/or operationally intensive, the extraction process itself has adverse environmental effects, and/or the product in which the nutrients are recovered is polluted with substances harmful to human health. Hence, it is an aim of the present invention to overcome one or more of the problems of the art. In particular, there is a need for an improved method that can recover N, K, and P without the aforementioned drawbacks.

SUMMARY OF THE INVENTION

The presently described method(s) address one or more problems of the art in the field of nutrient removal and recovery. In particular, a method is provided for recovering nitrogen (N), Potassium (K), and phosphorus (P) from a liquid waste stream; preferably from a stream of urine, water comprising excreta (e.g. faeces, manure, digestate, fertilizer), or from (concentrated) waste water, for example, municipal (e.g. sewage, septic) and/or industrial wastewater (e.g. food and feed industry, agriculture, mining, etc.); most preferably from urine, such as human or animal urine.

The provided method, or a preferred embodiment thereof, can be chemically, energetically and/or operationally less intensive, and the extraction process itself has little to no adverse environmental effects. The quality (concentration) of the end products can be high, with little to no presence of products harmful to human health, even if they are present in the liquid waste stream. The method can be energy-efficient. Liquid waste streams with lower and/or higher concentrations of N, P and K compared to conventional processes can be treated; therefore, the method can be compatible with a wider range of waste stream sources or solutions. The size and capacity of the apparatus (installation) for performing the method can be easily adapted and scaled, and can also be made modular. As a result, highly concentrated end products may be produced, while requiring little storage capacity. Accordingly, the present invention relates to a method for recovering N, K, and P from a liquid waste stream, wherein the waste stream comprises N, K, and P, the method comprising the steps of:

a. removing a N-comprising compound from the waste stream, thereby obtaining a N-poor solution;
b. concentrating the N-poor solution through water removal, thereby obtaining a concentrated solution;
c. adding a nucleating agent to the concentrated solution; and,
d. precipitating a K/P-comprising compound from the concentrated solution, thereby obtaining a K/P-comprising compound and a waste solution.

These steps are performed in this order. Since step a. comprises removing a N-comprising compound from the waste stream, a N-poor solution and the N-comprising compound are obtained. The person skilled in the art will understand that throughout the application, N, K, and P are recovered as the N-comprising compound and the K/P-comprising compounds respectively. Optionally, steps a. and b. are combined.

In some preferred embodiments, (during step a.) at least 80.0% of reduced N, in which N has a negative oxidation state, is removed, preferably at least 90.0%, more preferably 95.0%; most preferably 98.0%; for example about 99.0%, with the % based on the total amount of N in the waste stream as measured using the Kjeldahl measurement method according to ISO 5663:1984.

In some preferred embodiments, the pH of the liquid waste stream is at least 7 to at most 14, preferably at least 8 to at most 13, preferably at least 9 to at most 12, most preferably at least 10 to at most 11. Preferably, the pH of the N-poor solution and/or the concentrated solution is in these ranges as well. In some embodiments, the pH of any one of: the waste stream, the N-poor solution, and the concentrated solution, is at least 7 to at most 14, preferably at least 8 to at most 13, preferably at least 9 to at most 12, most preferably at least 10 to at most 11.

In some preferred embodiments, (during step a.) the concentration of N in the N-poor solution is at most 100.0 mg/l; preferably 75.0 mg/l; more preferably 50.0 mg/l; most preferably 25.0 mg/l; for example 20 mg/l; with the total concentration of N in the waste stream as measured using the Kjeldahl measurement method according to ISO 5663:1984

In some preferred embodiments, the N-comprising compound is an organically bound N-compound; preferably ammonia, urea, isobutyldiurea, an amine and/or an amine-containing compound.

In some preferred embodiments, step b. is performed until the concentrated solution contains a P concentration of at least 50 mg/l; preferably at least 100 mg/l; more preferably at least 1000 mg/l; most preferably at least 10000 mg/l.

In some preferred embodiments, step b. is performed until the water removal is at least 50.0%; preferably at least 60.0%; more preferably at least 70.0%; most preferably at least 80.0%; wherein 100.0% is the total amount of water present in the N-poor solution.

In some preferred embodiments, the nucleating agent is an Mg-comprising compound or solution, typically forming a source of $Mg^{2+}$ ions, preferably the nucleating agent is $MgCl_2$ and/or MgO, most preferably the nucleating agent is a concentrated $MgCl_2$ solution and/or MgO.

In some preferred embodiments, the $Mg^{2+}$ concentration added to the concentrated solution is at least 1.0 g/l; preferably at least 5.0 g/l; more preferably at least 10.0 g/l; most preferably at least 50.0 g/l, for example 60.0 g/l.

In some preferred embodiments, the average dosage speed of Mg concentration added to the concentrated solution is adjusted to the P concentration in concentrated solution; preferably is at least 1.0 mg×mol $Mg^{2+}$ per mol P to at most 1.5 mg×mol $Mg^{2+}$ per mol P; most preferably at least 1.1 mg×mol $Mg^{2+}$ per mol P to at most 1.4 mg×mol $Mg^{2+}$ per mol P.

In some preferred embodiments, the average dosage speed of Mg concentration added to the concentrated solution is adjusted to the P concentration in concentrated solution; preferably is at least 1.0 mol $Mg^{2+}$ per mol P to at most 1.5 mol $Mg^{2+}$ per mol P; most preferably at least 1.1 mol $Mg^{2+}$ per mol P to at most 1.4 mol $Mg^{2+}$ per mol P.

In some preferred embodiments, the K/P-comprising compound is potassium struvite $MgKPO_4.6H_2O$.

In some preferred embodiments, the K:P molar ratio in the concentrated solution is at least 0.5:1, preferably at least 1:1, more preferably at least 2:1, most preferably at least 5:1, for example 6:1.

In some preferred embodiments, the K:P molar ratio in the waste stream is at least 0.5:1, preferably at least 1:1, more preferably at least 2:1, most preferably at least 5:1, for example 6:1.

In some preferred embodiments, the K/P-comprising compound has a purity of at least 1.0 wt % of K, preferably 2.0 wt %; more preferably 5.0 wt %; most preferably 10.0 wt %.

In some preferred embodiments, step a. and/or step b. are performed through membrane distillation.

In some preferred embodiments, none of N, K, or P are added to any one of: the waste stream, the N-poor solution, and/or the concentrated solution prior to the following treatment step.

According to a further aspect, the present invention relates to an apparatus configured for performing the method according to an embodiment as described herein, wherein the apparatus comprises an N-removal unit, a water removal unit and a crystallisation unit.

In some preferred embodiments, the N-removal unit is configured for performing step (a) of the method as described herein.

In some preferred embodiments, the water removal unit is configured for performing step (b) of the method as described herein.

In some preferred embodiments, the crystallisation unit is configured for performing steps (c) and (d) of the method as described herein.

BRIEF DESCRIPTION OF THE DRAWINGS

FIG. 3 illustrates a bar graph depicting the effect of molar ratio (Mg:P:K), solution pH (e.g. 8, 9 and 10) and temperature (e.g. 20°, 30° and 40° C.) on the elemental mass composition (%) of the K/P containing compound. In particular.

DETAILED DESCRIPTION OF THE INVENTION

Figure 1:
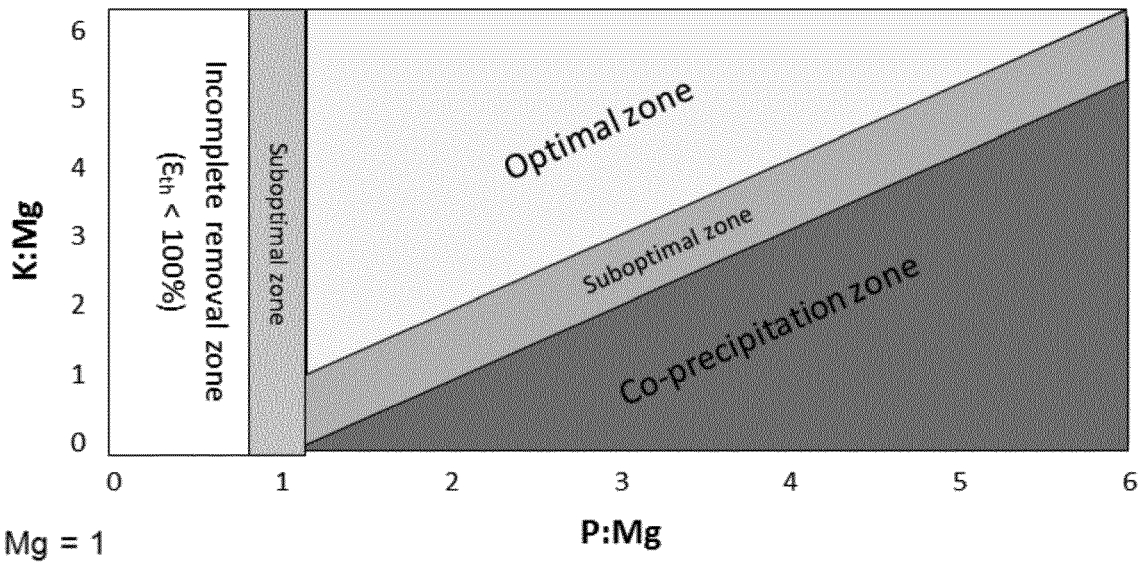
FIG. 1 illustrates a graph depicting the preferred molar ratio(s) of Mg, K and P for precipitation of a K/P containing compound. The zones are preferably separated by following relationships: y=x+0.25; y=x−0.75; x=0.75; x=1.25.

Before the present unit and method of the invention is described, it is to be understood that this invention is not limited to particular units and methods or combinations described, since such units and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized and/or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

The present invention generally relates to a method for recovering nitrogen (N), Potassium (K), and phosphorus (P) from a liquid waste stream; preferably from a stream of urine, a stream (e.g. water) comprising excreta (e.g. faeces, manure, digestate, fertilizer), or (concentrated) waste water, for example, municipal (e.g. sewage, septic) and/or industrial wastewater (e.g. food and feed industry, agriculture, mining, etc.); more preferably urine, such as human or animal urine; most preferably human urine. The method, and/or preferred embodiments thereof, can be chemically, energetically and/or operationally less intensive, and the extraction process itself has little to no adverse environmental effects. The quality (concentration) of the end products can be high, with little to no presence of products harmful to human health, even if they are present in the liquid waste stream. The method can be energy-efficient: low-grade energy, e.g. waste or solar heat, may be used to run the process. Liquid waste streams with lower and/or higher concentrations of N, P and K compared to conventional processes can be treated: therefore, the method can be compatible with a wider range of waste stream sources or solutions. The size and capacity of the installation can be easily adaptable and scalable and can be made modular. End products can be produced as highly concentrated and requiring only little storage capacity.

In a most general aspect the present invention relates to a method for recovering N, K, and P from a liquid waste stream, wherein the waste stream comprises N, K, and P, the method comprising the steps of:

a. removing a N-comprising compound from the waste stream, preferably through membrane distillation, thereby obtaining a N-poor solution and the N-comprising compound;

b. concentrating the N-poor solution through water removal, preferably through membrane distillation, thereby obtaining a concentrated solution;

c. adding a nucleating agent to the concentrated solution; and, d. precipitating a K/P-comprising compound from the concentrated solution, thereby obtaining a K/P-comprising compound and a waste solution.

These steps are clearly performed in this order: the nucleating step is performed on the concentrated solution, and the concentration step is performed on the N-poor solution.

In some preferred embodiments, none of N, K, or P are added to any one of: the waste stream, the N-poor solution, and/or the concentrated solution prior to the following treatment step, since the object is to recover N, K, and P. When referring to addition of N, K, and P, the present application refers to addition of a N-comprising compound, a K-comprising compound, and a P-comprising compound respectively.

In some preferred embodiments, no N is added to any one of: the waste stream, the N-poor solution, and/or the concentrated solution prior to the following treatment step, since the object is to recover N.

In some preferred embodiments, no K is added to any one of: the waste stream, the N-poor solution, and/or the concentrated solution prior to the following treatment step, since the object is to recover K.

In some preferred embodiments, no P is added to any one of: the waste stream, the N-poor solution, and/or the concentrated solution prior to the following treatment step, since the object is to recover P.

In some preferred embodiments, steps a. and b. are combined and/or performed simultaneously; preferably using membrane distillation. In some preferred embodiments, the advantage of using membrane distillation (in both modes) is that both steps can be combined into a single step as well. When water removal is done on an N-poor solution, the N component may increase in concentration and start to form MAP instead of K-struvite. By using membrane distillation for water removal, the N is removed simultaneously and as such more K/P is recovered as K-struvite and no MAP is formed.

In some preferred embodiments, step b. also comprises removing the N-comprising compound from the waste stream, preferably through membrane distillation, thereby obtaining the N-comprising compound.

This method is non-specific and independent of the type or source of a waste stream as long as the stream is liquid (i.e. has fluid properties) and its composition comprises N, K, and P. The N, K, and P can each be present in low concentrations, i.e. lower than at most 100 mg/l for example 25 mg/l, 50 mg/l, 75 or 99 mg/l; in intermediate concentrations, i.e. between at least 100 mg/l and at most 10000 mg/l for example 500 mg/l, 1000 mg/l, 2500 mg/l, 5000 mg/l, or 7500 mg/l; or in high concentrations, i.e. higher than at least 10000 mg/l for example 15000 mg/l, 25000 mg/l or 50000 mg/l. Alternatively, the N, K, and P can also be present in varying concentrations, such as a low concentration of P, for example 50 mg/l P, an intermediate concentration of N, for example 1000 mg/l N, and a high concentration of K, for example 10000 mg/l K. In some preferred embodiments, the K:P molar ratio in the waste stream is at least 0.5:1, preferably at least 1:1, more preferably at least 2:1, most preferably at least 5:1, for example 6:1. As soon as more "impurities" are present, the K:P ratio may start to change as P can precipitate with Mg under other forms than with K. Therefore, if a lot of P is initially present, the K:P ratio will go up during the precipitation whereby first a Mg/P salt may be formed, and only afterwards $MgKPO_4$ (K-struvite).

The term "waste stream" as used herein refers to (waste) water that has been adversely affected in quality by human or animal influence. In some embodiments the waste stream comprises (organic) matter discharged from a biological body, such as bacterial, animal or human. The organic matter can have a solid or semiliquid form such as faeces, manure, digestate of anaerobic digestors, or be fully liquid, such as urine. The waste stream may be wastewater not (yet) subjected to nitrification/denitrification, such as domestic wastewater. In other embodiments the waste stream comprises unusable or unwanted substances (e.g. industrial by-product or waste products) that are fully or partially dissolved, such as suspended or dissolved fly ash, wastewaters from industrial food and feed production or agriculture, other chemicals potentially harmful for human health. It is further noted that, although liquid streams are preferred for the present method, most solid forms (e.g. lumps, suspensions) can also be made sufficiently liquid through dissolving or mixing with a suitable solvent, such as water.

In some preferred embodiments the waste stream is a stream of urine, or is a stream comprising excreta (e.g. faeces, manure, digestate, fertilizer), or is (concentrated) wastewater, for example, municipal (e.g. sewage, septic) and/or is industrial wastewater (e.g. food and feed industry, agriculture, mining).

In some more preferred embodiments the waste stream is urine, more preferably human or animal urine; most preferably human urine. Urine has a much higher phosphate concentration than sludge water, allowing a simpler and less expensive process for precipitation of phosphates.

In some embodiments prior to step a., preferably wherein the waste stream is urine, the urine is hydrolysed. For example, hydrolysis can be ensured by mixing fresh urine with (partially) hydrolysed urine and allowing for 2 days of contact time (mixed) at room temperature (25° C.). Hydrolysed urine has a typical pH value of at least 9, and has >90% of all reduced N present as either the ammonium-ion or ammonia gas (dissolved); thus the pH is more optimal for the method and the N is present as ammonium. Additionally or alternatively, the method may comprise further steps to enhance the hydrolysis process: adding a hydrolysis catalyst such as urease (i.e. enzyme); heating to a temperature of 65° C. or higher; allowing and/or promoting (natural) bacterial growth in a non-sterile environment.

The term "solution" hereby refers to a liquid mixture in which the minor component (i.e. the solute) is uniformly distributed within the major component (i.e. the solvent). The term "concentrated solution" hereby refers to a solution with an increased concentration of solute compared to the initial (provided) solution, contrary to a "poor solution", which instead refers to a solution with a decreased concentration of solute.

The term "nucleating agent" as used herein refers to a substance used to modify the properties of a solution by promoting nucleation to create a solid from a solution. The solid formed is called the 'precipitate'; the chemical that causes the solid to form is also called the 'precipitant'. Examples of nucleating agents (precipitants) suitable for the present method include $MgCl_2$ or MgO. Examples of K/P-comprising compounds (precipitates) suitable for the present method include potassium struvite.

As used herein, the terms struvite and K-struvite (or potassium struvite) are very different. Struvite is the N-containing precipitate $MgNH_4PO_4$ which does not contain K, while K-struvite (or potassium struvite) is the K-containing precipitate $MgKPO_4$. The chemical properties (and modes of action as fertilizer) of the two are completely different.

The term "compound" as used herein refers to substance consisting of atoms or ions of two or more different elements in definite proportions joined by chemical bonds into a molecule. By extension, "N-comprising compound" thus refers to a compound comprising at least one N atom, preferably two or more N atoms. Examples include urea, isobutyldiurea, uric acid, ammonium, proteins, amino acids, (N from fish), and others. Similarly, a K-comprising compound comprises at least one K atom, preferably two or more K atoms. Examples include the potassium ion ($K^+$), KCl, $K_2CO_3$, $K_2SO_4$, $KNO_3$, and others. A P-comprising compound comprises at least one P atom, preferably two or more P atoms. Examples include phosphate ions, (orthophosphate), phosphoric acid, all types of inorganic and organic phosphate salts, and organically bound phosphates (e.g. DNA, surfactants, etc.) and others.

Preferably the N-comprising compound is ammonium, since it was found that it is mainly ammonium-N that interferes with K-struvite precipitation, as ammonium forms normal struvite. However, preferably other (organic) N compounds are also removed, as they can be converted to ammonia in different waste streams, due to hydrolysis. Therefore, in some embodiments, the N-comprising compound is a compound that can be converted to ammonia. Nitrate and nitrite may be too oxidized, and are typically not reduced back to ammonia, so in some embodiments these should not necessarily be removed.

Step a. comprises: removing a N-comprising compound from the waste stream, preferably through membrane distillation, thereby obtaining a N-poor solution and the N-comprising compound.

In some embodiments during step a. the concentration of N in the N-poor solution is at most 100.0 mg/l; preferably 75.0 mg/l; more preferably 50.0 mg/l; most preferably 25.0 mg/l; for example 20.0 mg/l; with the total concentration of N in the waste stream as measured using the Kjeldahl measurement method according to ISO 5663:1984. When the concentration of N in the N-poor solution goes above 100.0 mg/l it becomes more difficult to recover a K/P comprising compound from the concentrated solution in step c. as precipitation of struvite occurs. Therefore in general the lower the N-concentration, the less precipitation of struvite occurs and thus the less interference is expected in step c. Moreover, when the N-concentration is reduced to levels in line with (national) legislative discharge regulations, the effluent of the complete process can be safely discharged without the need for further processing or dedicated storage.

In some embodiments during step a. at least 80.0% of reduced N (in which N has a negative oxidation state) is removed; preferably 90.0%; more preferably 95.0%; most preferably 98.0%; for example about 99.0%; with the % based on the total amount of N in the waste stream as measured using the Kjeldahl measurement method according to ISO 5663:1984, which is a method for the quantitative determination of organic nitrogen in chemical substances like ammonia. A minimum recovery of at least 80.0% provides that discharge limits are met, and also the recovery of a K/P comprising compound is enhanced by keeping the reduced N:P ratio below or equal to 0.1:1 when hydrolysis/degradation of the latter occurs.

In some preferred embodiments, the ratio N:K is at most 1:5; but preferably at most 1:10, more preferably at most 1:20, most preferably at most 1:50, for example 1:60. The inventors found that the K and P recovery significantly increased for such ratios with lower relative N.

In some embodiments during step a. the N-poor solution comprises at most 0.01 wt. % N for example 0.009 wt. % or 0.007 wt. %; preferably at most 0.005 wt. % for example 0.004 wt. % or 0.002 wt. %; more preferably at most 0.001 wt. % for example 0.0009 wt. % or 0.0007 wt. %; most preferably at most 0.0005 wt. % for example 0.0004 wt. %, 0.0002 wt. %, 0.0001 wt. % or lower; with the wt. % based on the total weight of the N-poor solution. Similarly to above, the maximal wt. % provides for sufficient discharge limits and recovery of a K/P comprising compound.

In some embodiments during step a. the N-comprising compound is an organically bound N-compound; preferably ammonia, urea, isobutyldiurea, and/or an amine or amine-containing compound. All of the listed compounds can be measured through the Kjeldahl measurement method.

In some embodiments, during step a. the pH is at least 7 to at most 14; preferably at least 8 to at most 13, preferably at least 9 to at most 12, most preferably at least 10 to at most 11. If the pH is lower than 7 removal of ammonia from a solution is more difficult or even prevented because ammonia is present as $NH_4^+$ and is thus not volatile. The preferred value of pH 10 to 11 allows for a most efficient removal of ammonia because $NH_3$ is present in a concentration of above 95%, for example 97% or 99%. Above pH 11, the precipitation of the K/P containing compound is reduced, since co-precipitation may occur. Below pH 7, the precipitation of the K/P containing compound is more difficult. Between pH 10 to 11 the co-precipitation is reduced, which allows for the further precipitation of the K/P-containing compound. Other suitable pH ranges include: at least 8 to at most 14; at least 9 to at most 14; at least 10 to at most 14; at least 7 to at most 13; at least 9 to at most 13; at least 10 to at most 13; at least 7 to at most 12; at least 8 to at most 12; at least 10 to at most 12; at least 11 to at most 12; at least 7 to at most 11; at least 8 to at most 11; at least 9 to at most 11.

In some embodiments step a. is performed through membrane distillation, preferably using Direct Contact Membrane Distillation (DCMD). Advantages of DCMD include a high N flux through the membrane (e.g. 200 g $N/m^2 \cdot h$ or higher), an improved ease of operation (recirculation suffices), ease of cleaning (limited wetted components and fouling compression), a higher selectivity towards ammonia recovery compared to alternative method (e.g. ammonia stripping), lower energy requirements, cheaper components, inertness to chemicals used in the process and more.

It was found that an additional advantage for membrane distillation (and especially DCMD) is that it was possible to concentrate the solution and simultaneously further reduce the N concentration (due to the high N flux, even during water recovery), which increases the K:P recovery. As such, it was surprising that concentration (water removal) by MD increased the K:P recovery, because one is not simultaneously concentrating N (otherwise the N:P and N:K ratio would not change), but one is further removing N whilst concentrating.

Alternatively, other nitrogen recovery or removal methods can be used for the removal of an N-comprising compound in step a., although their chemical and/or operational efficiency may be reduced when compared to the DCMD method. The alternative methods include: ammonia stripping, nitrification, nitrification coupled to denitrification, chemical oxidation to nitrate, precipitation of urea with isobutylaldehyde, sweeping-gas membrane distillation, vacuum membrane distillation, air-gap membrane distillation, permeate-gap membrane distillation, pervaporation and membrane contactor processes. Since anaerobic digestion leaves a N-rich digestate, it is not considered a N removal method that leaves a N-poor solution.

In some embodiments, step b. is performed until the concentrated solution contains a P concentration of at least 50 mg/l for example 75 mg/l or 90 mg/l; preferably at least 100 mg/l for example 250 mg/l, 500 mg/l or 750 mg/l; more preferably 1000 mg/l for example 2500 mg/l, 5000 mg/l or 7500 mg/l; most preferably 10000 mg/l for example 12000 mg/l, 13000 mg/l or 15000 mg/l. The minimum concentration of 50 mg/l provides that the method is able to produce enough product containing sufficient K and P. By increasing the concentration more amount of product can be produced at similar or better quality, the waste products (effluents) may contain less total nutrients (reducing associated costs), and the precipitation process may produce more K/P-comprising compounds per unit time; the upper concentration can be raised as long as the liquid properties (e.g. viscosity) remain unaltered.

In some embodiments, step b. is performed until the water removal is at least 50.0%; preferably at least 60.0%; more preferably at least 70.0%; most preferably at least 80.0%; wherein 100.0% is the total amount of water present in the N-poor solution. In some embodiments step b. is performed until the water removal is at least 50.0% and at most 99.0%; preferably at least 60.0% and at most 95.0%; more preferably at least 70.0% and at most 92.0%; most preferably at least 80.0% and at most 90.0%; wherein 100.0% is the total amount of water present in the N-poor solution. Removal of 50.0% or more water allows having sufficient concentrative effects to produce more of the K/P containing compound at the same purity. By removing more than 99.0% of water, however, the liquid properties and crystallization properties of the crystallization liquor are lost and the method becomes more difficult or is even prevented.

It was found that removing water works best if the water removal step also further reduces the N content, as the N:P and N:K ratio thus decrease, which enhances P and K recovery as K-struvite. While concentration allows to remove more K and P given the physics of precipitation, it was surprising in the sense that a solution that could be undersaturated in K and P can by concentration become supersaturated and start to precipitate K and P. In addition, it was surprisingly found that the water removal allows to recover K:P faster (i.e., kinetics are increased).

In some embodiments step b. is performed until the concentrated solution contains a K concentration of at least 100 mg/l for example 200 mg/l, 300 mg/l or 400 mg/l; preferably at least 500 mg/l for example 600 mg/l, 750 mg/l or 900 mg/l; more preferably at least 1000 mg/l for example 1250 mg/l, 1500 mg/l or 1750 mg/l; most preferably at least 10000 mg/l for example 11000 mg/l, 12000 mg/l or 15000 mg/l.

In some embodiments, the water in step b. is removed through membrane distillation, preferably using Air Gap Membrane Distillation (AGMD). Advantages of AGMD include ease of operation (recirculation suffices), ease of cleaning (limited wetted components and fouling compression), lower energy requirements compared to other types of (membrane) distillation, no need for a cooling liquid (the system uses latent heat losses instead of a cooling solution), cheaper components, no need for a high pressure pump, and more. Alternatively, other water recovery or removal methods can be used for the removal of water or concentrating the N-poor solution in step b., although their chemical and/or operational efficiency may be reduced when compared to the AGMD method. The alternative methods include: distillation (amongst which vacuum, vapour compression and multi-effect distillation), (nano)filtration, reverse osmosis, forward osmosis. By using membrane distillation in front of K struvite to recover water, it was found that one simultaneously further lowers the N:P and N:K ratios, which further enhances K-struvite recovery.

In some preferred embodiments the nucleating agent in step c. is a Mg-comprising compound; more preferably the nucleating agent is $MgCl_2$ and/or MgO; most preferably the nucleating agent is a concentrated $MgCl_2$ solution and/or MgO. Alternatively, a sacrificial magnesium electrode could be used, as well as any solution containing Mg-ions in a concentration above 1.0 g/l, for example seawater or a solution of other Mg-salts, or a solid which, when dissolved in a solvent, will release $Mg^{2+}$ ions. However, MgO and/or $MgCl_2$ are preferred because these salts dissolve well and sufficiently release $Mg^{2+}$-ions, as well as (in the case of MgO) provide OH— ions to increase the pH. Accordingly, MgO and/or $MgCl_2$ further improve the precipitation of a K/P containing compound. Another alternative is an electrochemical cell that can provide half-cell reactions.

In some embodiments the $Mg^{2+}$ concentration as added in the concentrated solution is at least 1.0 g/l, for example 2.0 g/l, 3.0 g/l or 4.0 g/l; preferably at least 5.0 g/l, for example 6.0 g/l, 7.5 g/l or 9.0 g/l; more preferably at least 10.0 g/l, for example 20.0 g/l, 30.0 g/l or 40.0 g/l; most preferably at least 50.0 g/l, for example 60.0 g/l, 75.0 g/l or 100.0 g/l. Providing a minimum Mg concentration of 1.0 g/l allows for sufficient precipitation of a K/P containing compound to produce enough product containing K and P. By increasing the $Mg^{2+}$ concentration more amount of product can be produced, thus the upper concentration can be raised as long as the liquid properties remain unaltered (e.g. viscosity). Therefore a nucleating agent containing a very high concentration of Mg works best, as it contributes very little volume and as such does not dilute the concentrated solution.

In some embodiments the average dosage speed of Mg concentration added to the concentrated solution is adjusted to the P concentration in concentrated solution measured using the Scheel method according to Scheel K. C. (1936) as published in Anal. Chem. 105, 256-269 hereby incorporated by reference. Preferably, the average dosage speed of Mg concentration is at least 1.0 mg×mol $Mg^{2+}$ per mol P to at most 1.5 mg×mol $Mg^{2+}$ per mol P; preferably at least 1.1 mg×mol $Mg^{2+}$ per mol P to at most 1.4 mg×mol $Mg^{2+}$ per mol P for example 1.2 mg×mol $Mg^{2+}$ per mol P or 1.3 mg×mol $Mg^{2+}$ per mol P. When the P concentration is determined by the Scheel method, Mg should preferably be added in equimolar amounts to the P treated within an hour. Advantageously at least 1.0 mg×mol $Mg^{2+}$ per mol P is dosed using the Mg solution, otherwise the Mg concentration may be too low to produce the entire possible K/P compound from the available K and P. However, when more than 1.5 mg×mol $Mg^{2+}$ is dosed per mol P, the high $Mg^{2+}$ concentration may start co-precipitation of undesired Mg-phosphates, thus preventing the precipitation of a K/P comprising compound.

In some preferred embodiments the K/P-comprising compound in step d. is potassium struvite $MgKPO_4.6H_2O$. The guided precipitation into potassium struvite allows for a very efficient K/P recovery.

Alternatively, other K/P-comprising compound can be obtained, albeit a reduced chemical or operational efficiency. Alternatives include $MgNH_4PO_4.6H_2O$, which can be precipitated if the provided ammonia removal in step b. is incomplete; or $Mg_3(PO_4)_2.xH_2O$, which can be precipitated in the absence of potassium ions; or $CaKPO_4.xH_2O$ and/or calcium phosphates, which can be precipitated if instead of a Mg-source a Ca-source is used instead. However, the maximum solubility of the Mg/P comprising compound should preferably be 1 g/L or too much P may be lost to the effluent. A combination of the latter with a K/P comprising compound is also possible.

In some embodiments during step d. the pH is at least 7 to at most 14; preferably at least 8 to at most 12, preferably at least 9 to at most 11, most preferably at least 10 to at most 11. If the pH is lower than 8 the concentrations of Mg, P and K need to be very high for the ion activity product of a K/P comprising compound to be larger than the solubility product.

If the pH is higher than 12 other compounds than the K/P comprising compound start to be formed. Thus the optimal value of pH 10 to 11 allows most efficient precipitation to occur for a very efficient K/P recovery. Other suitable pH ranges thus also include: at least 8 to at most 14; at least 9 to at most 14; at least 10 to at most 14; at least 7 to at most 13; at least 9 to at most 13; at least 10 to at most 13; at least 7 to at most 12; at least 8 to at most 12; at least 10 to at most 12; at least 11 to at most 12; at least 7 to at most 11; at least 8 to at most 11; at least 9 to at most 11.

In some embodiments the temperature of the concentrated solution during step d. is at least 0° C. and at most 60° C., preferably at least 5° C. and at most 50° C., preferably at least 10° C. and at most 40° C., preferably at least 15° C. and at most 30° C., for example about 20° C. or 25° C. The concentrated solution should preferably be at least liquid, hence the minimum temperature of 0° C. Of course, the addition of anti-freezing compounds to the solution allows the temperature to go below 0; it would, however, present a more costly alternative that further dilutes the optimal concentrations of the present method. In general the solubility of the K/P comprising compound is increased with temperature, thus rendering less precipitation; however, above 60° C. other reactions may conflict with or even prevent the precipitation.

In some embodiments the K:P molar ratio in the concentrated solution of step d. is at least 0.5:1; preferably at least 1:1; more preferably at least 2:1 for example 3:1 or 4:1; most preferably at least 5:1 for example 6:1 or 7:1. In the case that the K:P is lower than 1:1, precipitation of a K/P containing compound may be more difficult; thus a minimum K:P molar ratio of 1:1 provides that at least all P can be precipitated as a K/P comprising compound. Higher molar ratios may contribute further to the precipitation process.

In some embodiments the K:Mg molar ratio in the concentrated solution of step d. is at least 1:1; preferably at least 2:1; more preferably at least 3:1; most preferably at least 4:1, for example 5:1 or 6:1. In the case that the K:Mg is lower than 1:1, precipitation of a K/P containing compound may be more difficult; thus a minimum K:Mg molar ratio of 1:1 provides that at least all P can be precipitated as a K/Mg comprising compound. Higher molar ratios may contribute further to the precipitation process.

In some embodiments the Mg:P molar ratio in the concentrated solution of step d. is at most 2:1 and at least 1:1; preferably at most 1.5:1 and at least 1:1, for example 1:1. The K:P ratio is preferably kept similar or as close to similar to the K:Mg ratio; this provides that adequate Mg is available for a complete P recovery while still maintaining selectivity towards the K/P-containing compound. However, when the Mg:P ratio goes above 2:1, the process is hampered by co-precipitation of other Mg-phosphates.

Figure 2:
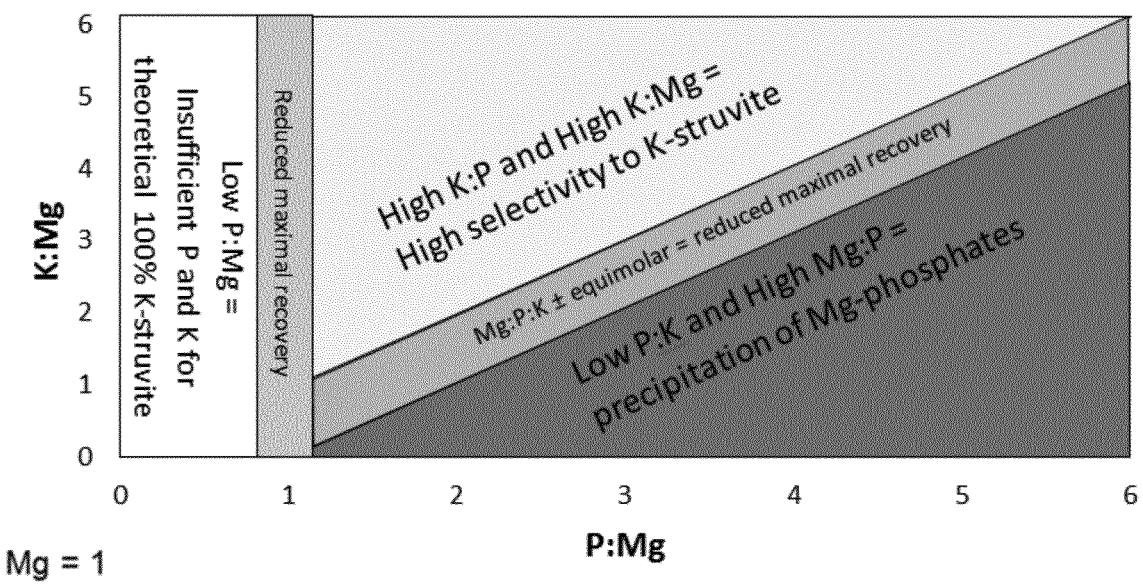
FIG. 2 illustrates a graph depicting the technical effect for the preferred molar ratio(s) of Mg, K and P for precipitation of a K/P containing compound. The zones are preferably separated by following relationships: y=x+0.25; y=x−0.75; x=0.75; x=1.25.
Figure 3A:
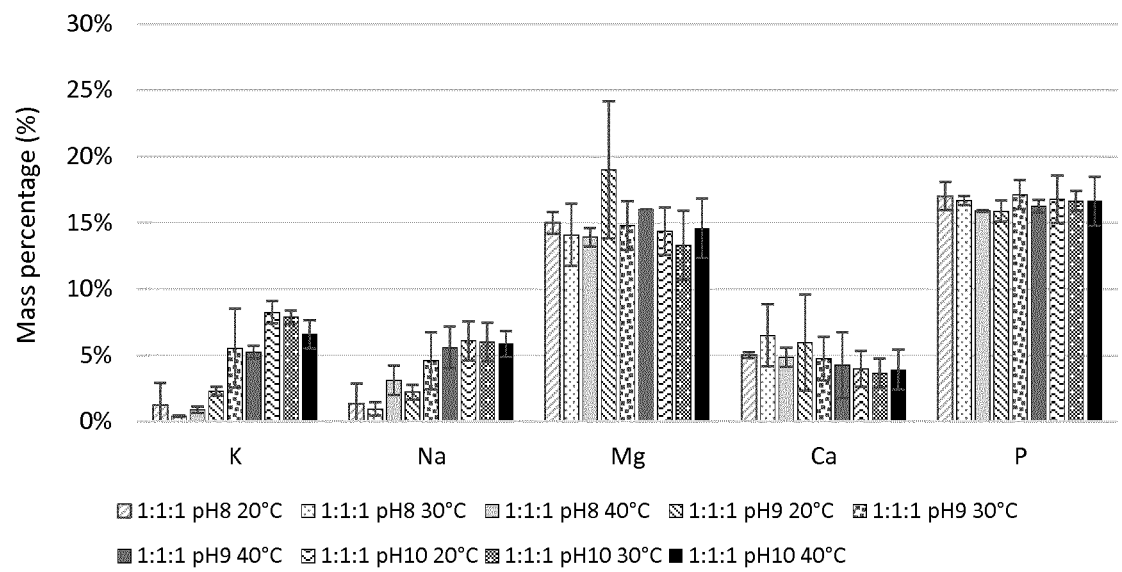
FIG. 3A depicts results for a molar ratio of 1:1:1.
Figure 3B:
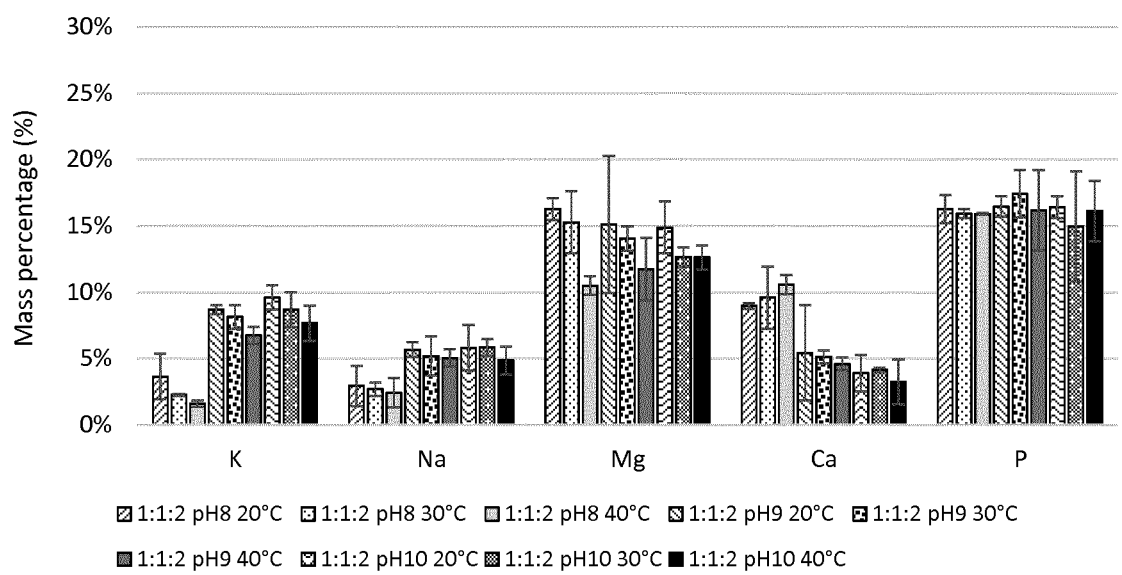
FIG. 3B for 1:1:2.
Figure 3C:
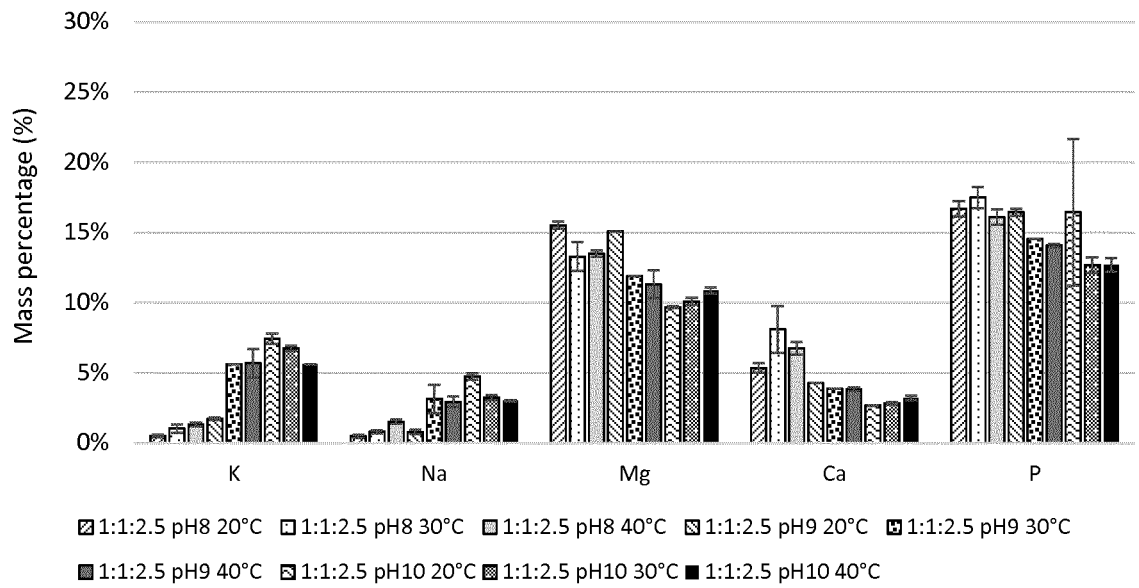
FIG. 3C for 1:1:2.5.
Figure 3D:
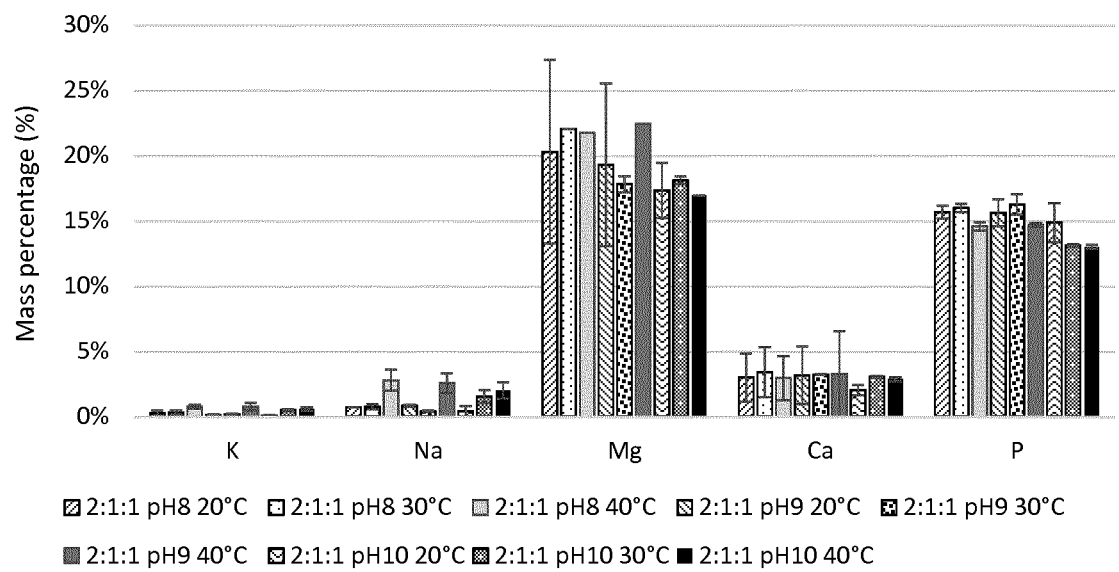
FIG. 3D for 2:1:1.
Figure 3E:
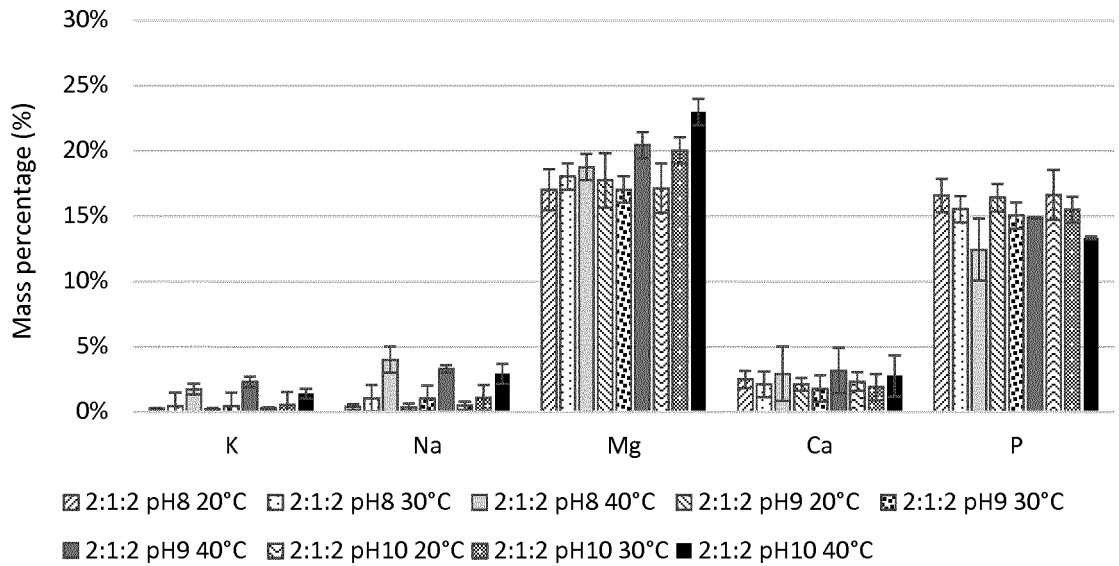
FIG. 3E for 2:1:2.
Figure 3F:
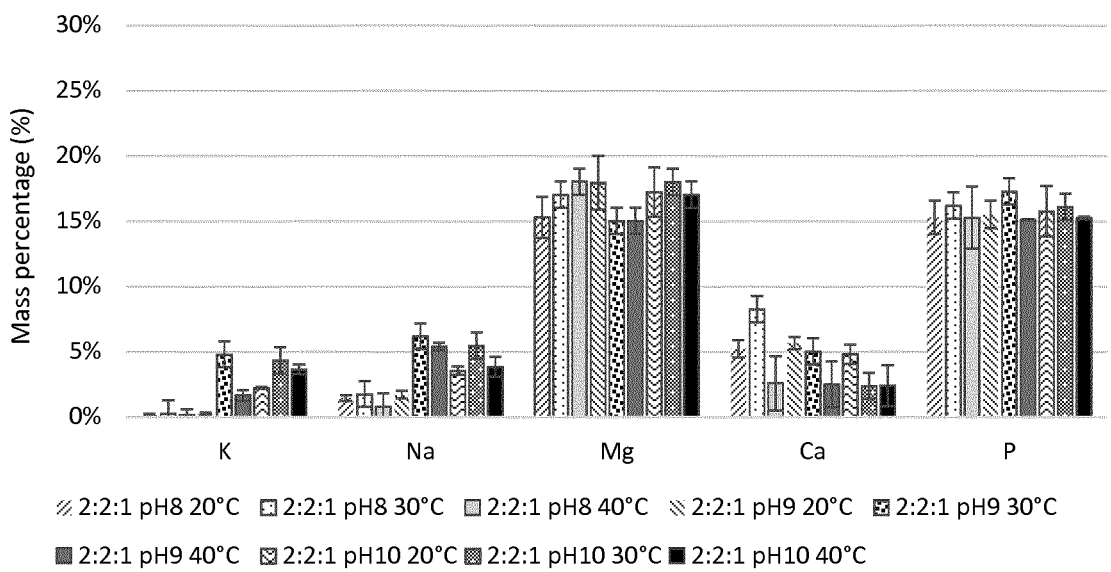
FIG. 3F for 2:2:1.

In some preferred embodiments the Mg:K:P molar ratio (optimal zone) in the concentrated solution is at least 1:1:1 with no limit to x when defined as 1:x:1, for example 1:2:1 or 1:5:1. The preferred Mg:K:P molar ratio is best exemplified with the optimal zone illustrated in FIG. 1 and FIG. 2 as the light grey area and discussed more in detail in Example 1. Keeping the respective concentrations within the ranges of the preferred molar ratio (or optimal zone) provides that at least all P can be precipitated as a K/P comprising compound. On the border of this preferred range, that is, wherein the K:P is below 1:1, the precipitation process is hampered by co-precipitation of other Mg-phosphates; similarly, wherein the Mg:P or the Mg:K is below 1:1 efficiency constraints or reduced selectivity towards the K/P comprising compound may be noted. Alternatively, in some other preferred embodiments the K:Mg:P ratio (optimal zone) is in the area bound by K=Mg, K=n*P, Mg=P, and K=P+1; wherein n is a value equal to or higher than 1 (n≥1); preferably wherein n is a value equal to or higher than 1.5 (n≥1.5); for example 2 such as K=2P; for example n=5, such as K=5P; for example n=10, such as K=10P; for example n=20, such as K=20P, for example n=50, such as K=50P, and so on. The K:P ratio on FIGS. 1 and 2 is limited to K:6P; however, this ratio is only cut-off for illustrative purposes and may in fact be many times higher. Similarly to above, on the border of this range, that is, extending up to P=0.75Mg, P=1.25Mg and K=n*P (wherein n≥1; preferably n≥1.5), the process may run sub optimally. By going further away from the (sub)optimal range, the process efficiency may be further diminished.

In some embodiments, the ratios of K, Mg, and P in the concentrated solution is defined by:
P/Mg is at least equal to 0.75 or greater; and
K/Mg is at least equal to P/Mg−1 or greater.

In some embodiments, the ratios of K, Mg, and P in the concentrated solution is defined by:
P/Mg is at least equal to 1.25 or greater; and
K/Mg is at least equal to P/Mg or greater.

In some embodiments the precipitated K/P comprising compound is dried, at least at 0° C. and at most at 400° C. until stable weight is achieved, preferably between 10 and 300° C. until stable weight is achieved, more preferably between 20 and 200° C. until stable weight is achieved, most preferably between 30 and 100° C. until stable weight is achieved, for example for 48 h at 40° C. until stable weight is achieved. Preferably the dried precipitated K/P comprising compound is subsequently dissolved in a concentrated acidic solution between a pH of at least −7 and at most +7, preferably between a pH of at least −2 and at most +2, more preferably between a pH of at least −1 and at most +1, for example pH −1 until the precipitate (e.g. K/P-comprising compounds is fully dissolved or does not further dissolve; wherein the pH values indicate the difference in pH between the precipitated K/P comprising compound and the concentrated acidic solution. Mass percentages are calculated on the K/P comprising compound treated this way and subsequently dissolved in an acidic solution. Subsequent ion analysis should preferably be performed to calculate the bulk mass percentage and determine the purity of the compound.

In some embodiments the K/P-comprising compound has a purity of at least 1.0 m % of K (wt. %); preferably at least 2.0 m % for example 3.0 m % or 4.0 m %; more preferably at least 5.0 m % for example 6.0 m %, 7.0 m %, 8.0 m % or 9.0 m %; most preferably at least 10 m %, for example 11 m %, 12 m %, 13 m %, 14.0 m %, 14.7 m % or 15.0 m %. In the case of K recovery, the purity is preferably determined by the K mass percentage or weight percentage. In general, a higher value is preferred.

In some embodiments the K/P-comprising compound has a purity of at least 2.0 m % of P (wt. %); preferably at least 3.0 m % for example 4.0 m %; more preferably at least 5.0 m % for example 6.0 m %, 7.0 m %, 8.0 m % or 9.0 m %; most preferably at least 10.0 m %, for example 11.0 m %, 11.6 m %, 12.0 m %, 13.0 m %, 14.0 m % or 15.0 m %. In case that other P-comprising compounds are targeted for recovery (i.e. compounds not comprising K, but only P), for example N/P, the purity is preferably determined by the P mass percentage or weight percentage. Similarly, a higher value is preferred.

In some embodiments the K/P-comprising compound has a purity of at least 1.0 m % of K (wt. %) and 2.0 m % of P (wt. %); preferably at least 2.0 m % of K and 3.0 m % of P, for example 3.0 m % of K and 4.0 m % of P; more preferably at least 5.0 m % of K and 5.0 m % of P, for example 7.0 m % of K and 7.0 m % of P; most preferably at least 10.0 m % of K and 10.0 m % of P, for example 12.0 m % of K and 12.0 m % of P, or 14.7 m % of K and 11.6 m % of P. Higher values are more preferred.

In some embodiments the K/P-comprising compound contains a Na and Ca co-precipitation of at most 5.0 m %; preferably at most 4.0 m %, for example 3.0 m %; more preferably at most 2.0 m % for example 1.5 m %; most preferably at most 1.0 m % for example 0.7 m %, 0.5 m % or 0.1 m %. High Na content may degrade the value of the K/P comprising compound because it may salinate the processes for which the K/P comprising compounds may be used (e.g. fertilizer). High Ca content can be undesirable as less of the P is available for production of the K/P comprising compound. Unless the recovery of Ca is the aim of the method; for example, when Ca-phosphates or $CaKPO_4$ are targeted the Ca m % content may be higher.

In some embodiments the K/P-comprising compound has an average crystal size of at least 10 μm for example 15 μm; preferably at least 20 μm for example 30 μm or 40 μm; more preferably at least 50 μm for example 55 μm; most preferably at least 60 μm or higher, for example 70 μm, 80 μm, 90 μm or 100 μm. Lower average crystal sizes may become more difficult to separate from the concentrated solutions.

The average crystal size is measured by a Mastersizer Malvern 3000 measurement; the suspended crystals are preferably measured in a solution of pH 10 to provide that only limited dissolution occurs. For an average crystal size of at least 50 µm the maximum standard deviation may be 20 µm; wherein the crystal size ranges from 30 µm to 70 µm.

In some embodiments the K/P-comprising compound is used as fertilizer or for fertilizer applications.

In some embodiments the K/P-comprising compound is used as a growth medium or food supplement, such as for algae or single-celled organisms (e.g. single-cell protein).

In some embodiments, the K/P-comprising compound can be used as a source for further processing towards specialty chemicals, e.g. phosphoric acid.

In a further aspect the present invention relates to an apparatus (or installation) for performing the method according to one or more embodiments of the method as described herein (for recovering N, K, and P from a liquid waste stream). The size and capacity of the apparatus is easily adaptable and scalable and can be made modular. As a result, highly concentrated end products may be produced, while requiring little storage capacity. Since the apparatus is configured to perform the method as described above, the individual units of the apparatus will be connected in the same order In some embodiments the apparatus comprises a means for pumping the waste stream comprising N, K, and P from a storage container, such as a vessel, to the apparatus; or alternatively, directly for pumping the waste stream directly from the waste stream source.

In some embodiments the apparatus comprises an N-removal unit configured for removing an N-comprising compound from the waste stream to obtain an N-poor solution (step a), such as ammonia stripping. Advantageously the N-removal unit is easily scalable. Preferably the N-removal unit is a membrane contactor unit; more preferably a direct contact membrane distillation (DCMD) unit. The N-removal unit can comprise different module sizes and arrangements, from flat-sheet, spiral wound modules to hollow fibre modules, or comprising any type of hydro- or omniphobic membrane. This allows for easy scaling from low scale (~1 l/h) to large scale (100 m$^3$/h and higher) production by increasing the membrane surface.

In some embodiments the apparatus comprises a water removal unit configured for concentrating the N-poor solution through water removal to obtain a concentrated solution (step b). The water removal unit may remove water by applying a vapour pressure gradient; preferably via low grade waste or solar heat. Preferably the water removal unit is an air gap membrane distillation (AGMD) device. Advantageously, the water removal unit can be adapted to use any modular configuration. Advantageously the water removal unit can use a hydrophobic or omniphobic membrane type, which allows easy scaling from low scale (~1 l/h) to large scale (100 m$^3$/h and higher) production. Additionally or alternatively, water may be removed using reverse osmosis using any type of commercial RO membrane and module size, as long as the salt removal is sufficient. Typically, buffer basins may be placed between the different modules, and any type of commercial displacement pump (e.g. piston, membrane, positive) can be used.

In some embodiments the apparatus comprises a crystallisation unit configured for adding a nucleating agent to the concentrated solution (step c) and precipitating a K/P-comprising compound from the concentrated solution (step d). Preferably an Mg-source is added to induce precipitation of a K/P-comprising compound. Ideally, the crystallisation unit is a tube-and-baffle reactor with an upward flow to induce sufficient K/P-comprising compound (crystal) growth. The K/P-comprising compounds (as crystals) are collected in a collection section that may be located at the bottom of the unit. Advantageously the collection section can be drained under gravity or pumped out. The (clean) water can flow out via an overflow weir. The crystallisation unit is preferably circular in shape, but can be rectangular if desired, and contains baffles to induce sedimentation of crystals. Upward flow can be induced by a pump or an impeller. The reactor can easily be scaled from low scale (~1 l/h) to large scale (100 m$^3$/h and higher) production by increasing the reactor size, while keeping the relative proportions in place.

In some preferred embodiments the apparatus comprises an N-removal unit, a water removal unit and a crystallisation unit according to an embodiment as described herein. Preferably the apparatus is configured for performing the method for recovering N, K, and P from a liquid waste stream according to an embodiment of the method as described herein; wherein each of the units is configured for performing one or more steps of the method as described herein. Additionally, the apparatus may comprise one or more basins placed between the different units.

In some preferred embodiments the apparatus is configured for scaling the production from a low scale (~1 l/h) to a large scale (100 m$^3$/h and higher) production.

EXAMPLES

To better illustrate the properties, advantages and features of the present invention some preferred embodiments are disclosed as examples with reference to the enclosed FIG. Accordingly, the present invention relates to many embodiments and adjustments as appreciated by those skilled in the art and the scope of the present invention is by no means limited to one of the illustrative examples presented below.

Example 1: Optimal Molar Ratio, Reaction Temperature and Solution pH for Precipitation of a K/P Containing Compound In FIG. 1 the molar ratio of Mg, K and P is presented, wherein Mg=1 and the K:Mg (y-axis) is varied in function of P:Mg (x-axis), and the relative molar ratios are divided into zones, most notably the optimal zone. In FIG. 2, the same data is shown with the expectations for the process efficiency when staying within or going outside of the optimal zone. As can be inferred from the figures, the optimal zone (light grey) comprises a Mg:K:P molar ratio range from approximately (<1):1:1 or 1:1.1:1.1, for example 1:2:2, 1:3:3 or 1:4:4, up to approximately 1:6:1, for example 1:12:2; more preferably the optimal zone extends to K=Mg, K=n*P (wherein n≥1; preferably n≥1.5), Mg=P, and Mg=⅔P. The K:P ratio on FIGS. 1 and 2 is limited to K=6P; however, this ratio is only cut-off for illustrative purposes and may in fact be many times higher, for example K=10P, K=20P, and so on. Keeping the concentrations within the molar ratio range of the optimal zone region ensures that at least all P can be precipitated as a K/P comprising compound, such as potassium struvite. On the border of the preferred optimal zone a suboptimal zone (darker grey) is indicated, wherein the K:P ratio is around or below 1:1; more preferably the suboptimal zone extends to P=0.8Mg, P=1.2Mg and P=6Mg. In the suboptimal zone the precipitation process is hampered by co-precipitation of other Mg-phosphates causing a reduced maximal recovery. Outside the optimal and suboptimal zones the process may be further hindered by efficiency constraints and/or a reduced selectivity. In particular, the incomplete removal zone (white) characterised by a low P:Mg may have insufficient P and K for a theoretical 100% struvite. In the co-precipitation zone (dark grey) characterised by a low P:K and high Mg:P the precipitation may favour Mg-phosphates over K. Additionally, not shown in the figures, when the Mg:P or the Mg:K is below 1:1 efficiency constraints or reduced selectivity towards the K/P comprising compound may be noted.

The effect of molar ratio, solution pH and temperature on the elemental mass composition of the K/P-comprising compound (using synthetic urine) is shown in FIG. 3. The legend shows the conditions at which the experiments are performed, with the molar ratio depicted as Mg:P:K. In particular, FIG. 3A. corresponds with a molar ratio of 1:1:1; FIG. 3B. with 1:1:2; FIG. 3C. with 1:1:2.5; FIG. 3D. with 2:1:1; FIG. 3E. with 2:1:2; and FIG. 3F. with 2:2:1. For all the listed molar ratios the pH was varied from 8 to 10 and the T from 20° to 40° C. In particular, the striped bar(s) correspond with a T=20° C.; the dotted ones with 30° C.; and the solid ones with 40° C. The light (light grey) coloured bars correspond with a pH=8; the darker (dark grey) with pH=9; and the darkest (black) with pH=10. The experimental results illustrated by FIG. 3 confirm the expected results illustrated by FIG. 1 and FIG. 2. To summarize, the molar ratios falling within the optimal zone (FIG. 3B and FIG. 3C) generally allow for a high precipitation of K; the molar ratios falling within the suboptimal zone (FIG. 3BA) show a slightly reduced precipitation of K; and the molar ratios falling outside (FIG. 3D, FIG. 3E and FIG. 3E) have a much reduced precipitation of K, favouring Mg instead. With regards to the reaction conditions, a pH=10 and a T=20° appears to improve the precipitation of K the most. It is, however, also noted that a pH of 9 shows notable improvements over 8, and a T of 30° shows improvements over 40° C. Moreover, the illustrated pH range of 8 to 10 shows a clear improvement over other pH values (e.g. below 8, such as 7 or 6, and above 10, such as 11 or 12) not shown in the figures. Similarly, the illustrated T range of 20° to 40° C. shows a clear improvement over other T values (e.g. below 20° C., such as 5° or 10° C., and above 40° C., such as 50 or 60° C.) also not shown in the figures.

Figure 4:
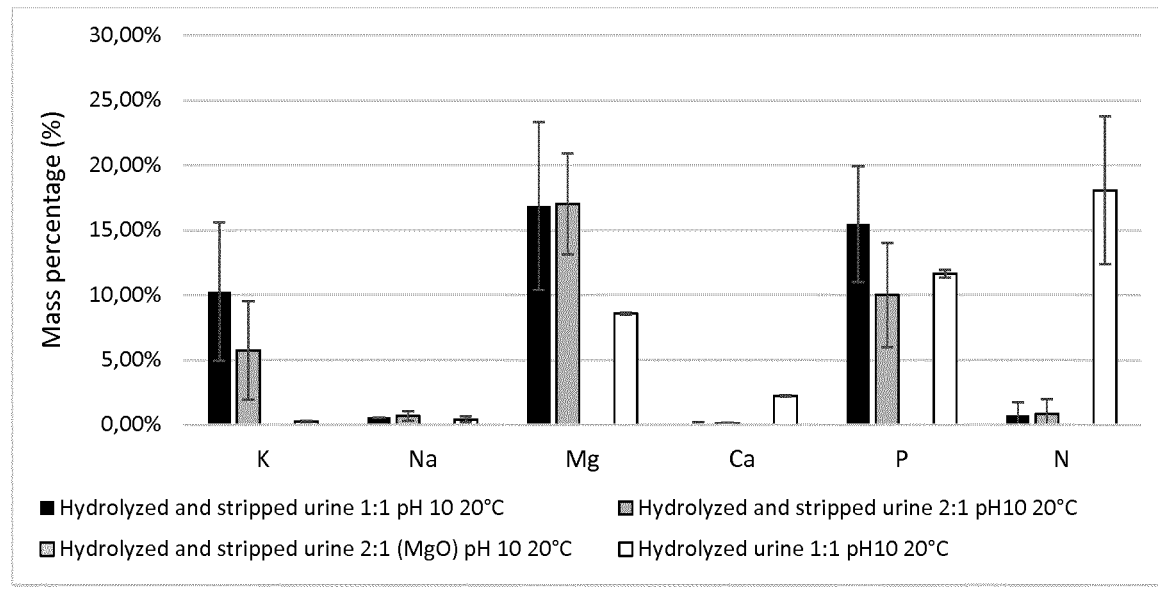
FIG. 4 illustrates a bar graph depicting the effects for hydrolysis of human urine with prior ammonia stripping for precipitation of a K/P containing compound (pH=10 and T=20° C.).

In FIG. 4, similar results are shown for hydrolysed, human urine with prior ammonia stripping. The (previously verified) optimal experimental conditions were selected, namely a pH=10 and T=20° C. The molar ratio is depicted as Mg:P (as the P:K ratio is fixed when using hydrolysed human urine). In particular, the black bar corresponds with a molar ratio of 1:1 and the dark grey bar with 2:1. The hydrolysed urine shown as the light grey serves as reference.

Figure 5:
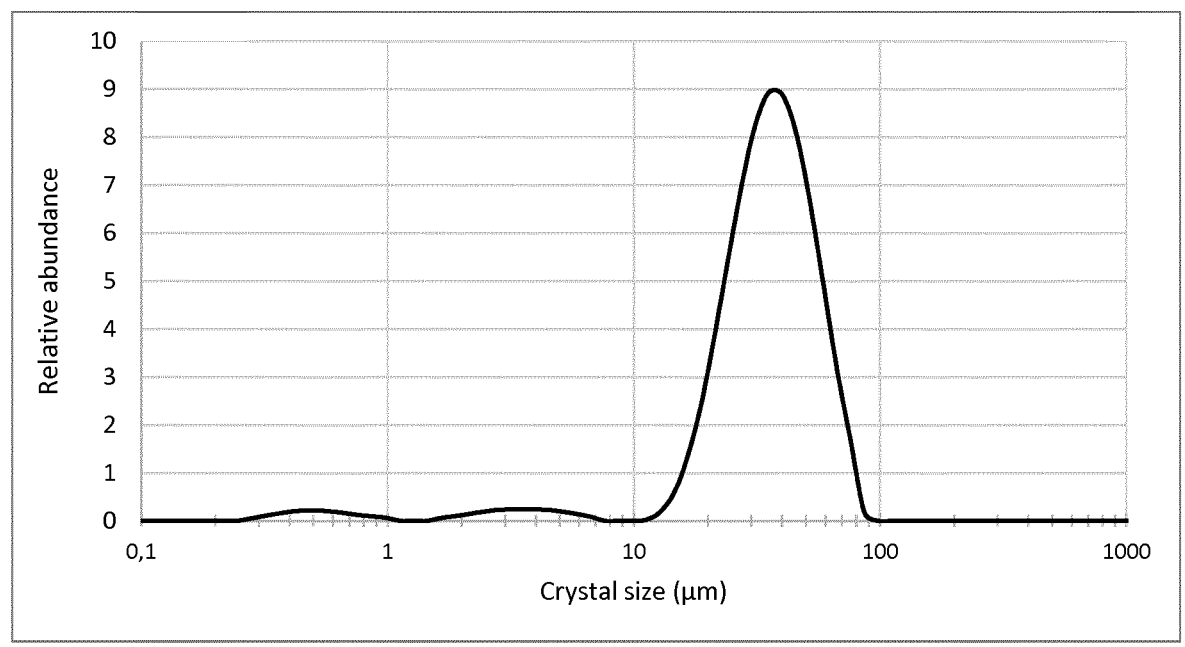
FIG. 5 illustrates a graph depicting the (average) crystal size (log scale) of a K/P containing compound in terms of relative abundance.

Lastly, FIG. 5 shows the (average) crystal size (in log scale) of a K/P containing compound in terms of relative abundance. In general most crystals may have a size ranging between 10 and 100 μm, more preferably between 20 and 60 μm; most preferably between 30 and 50 μm. Lower crystal sizes such as 0.5 μm or 5 μm may also be present in the solution, but may typically become more difficult to separate.

Example 2: Optimal Removal and Recovery of Nitrogen from the (Provided) Liquid Waste Stream (Step a)

Figure 6:
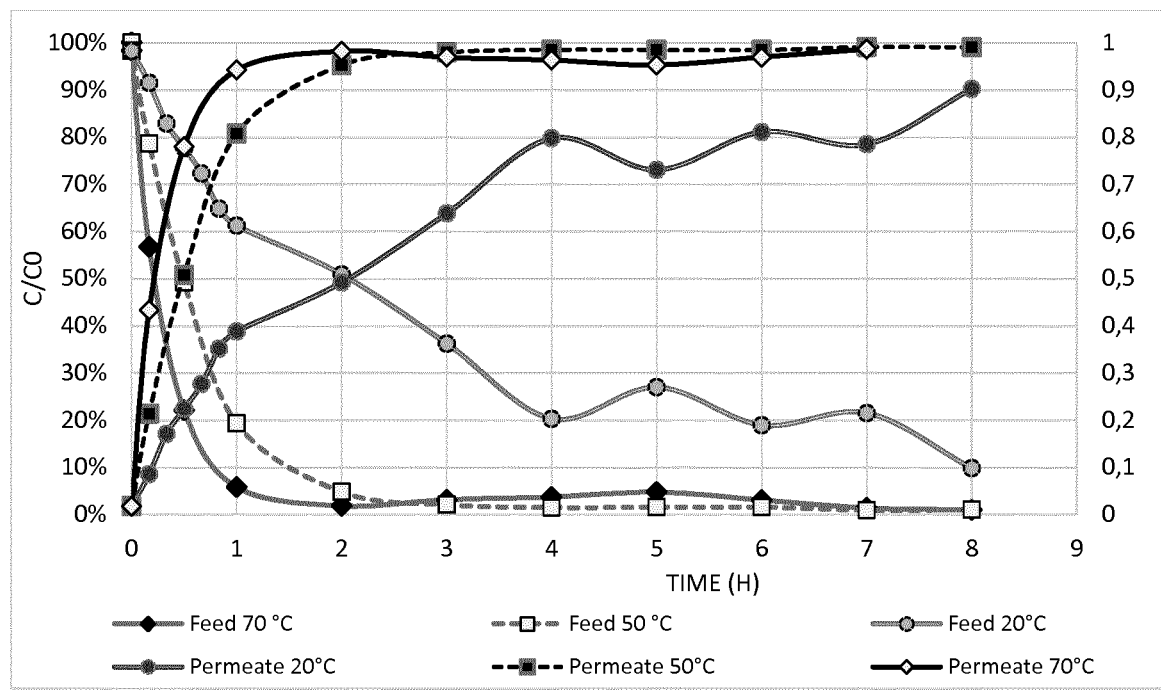
FIG. 6 illustrates a graph depicting the effect of temperature (e.g. 20°, 50° and 70° C.) on the removal and recovery of ammonia/ammonium-nitrogen using direct-contact membrane distillation.
Figure 7:
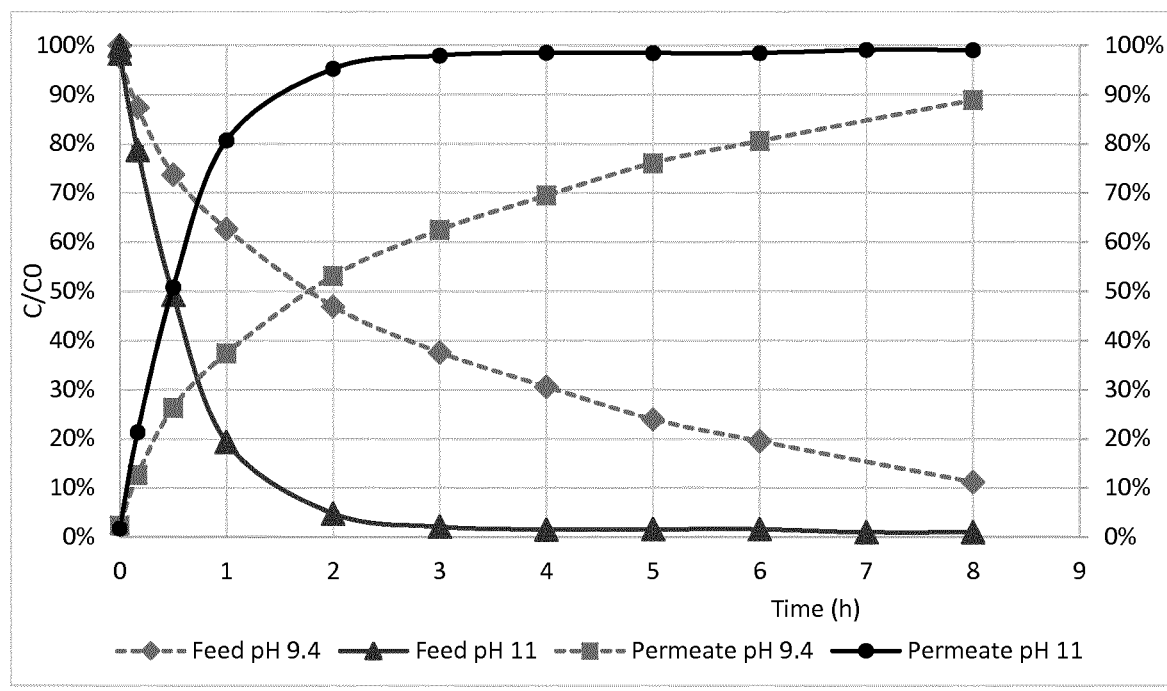
FIG. 7 illustrates a graph depicting the effect of pH (e.g. 9.4 and 11) on the removal and recovery of ammonia/ammonium-nitrogen using direct-contact membrane distillation.

In FIG. 6 and FIG. 7 the removal and recovery of ammonia/ammonium-nitrogen is presented at various temperatures (e.g. 20°, 50° and 70° C.) and pH values (e.g. 9.4 and 11) using direct-contact membrane distillation. As can be inferred from FIG. 6, a higher temperature at both sides of the membrane allows for a faster removal and recovery of the ammonia/ammonium nitrogen, while preventing selective water transport in either direction. However, temperatures above 80° C. have a negative effect on energy consumption. Furthermore, as shown in FIG. 7, a higher pH of the feed solution increases the removal and recovery of the ammonia/ammonium nitrogen by conversion of ammonium into volatile ammonia. At pH values above 11, all ammonia/ammonium nitrogen is present in the ammonia form. Running step (a) at higher pH values (e.g. above 11) thus requires more energy or caustic to be added, which is not economical for the process.

Example 3: Improved Kinetics and Overall Product Production of the K/P Comprising Compound Through Concentration In FIG. 8 and FIG. 9, the effect of concentrating the (provided) liquid waste stream on the dissolved phosphorus concentration ($PO_4$—P mg/l) and on the product elemental composition (%) is shown, respectively.

Figure 8:
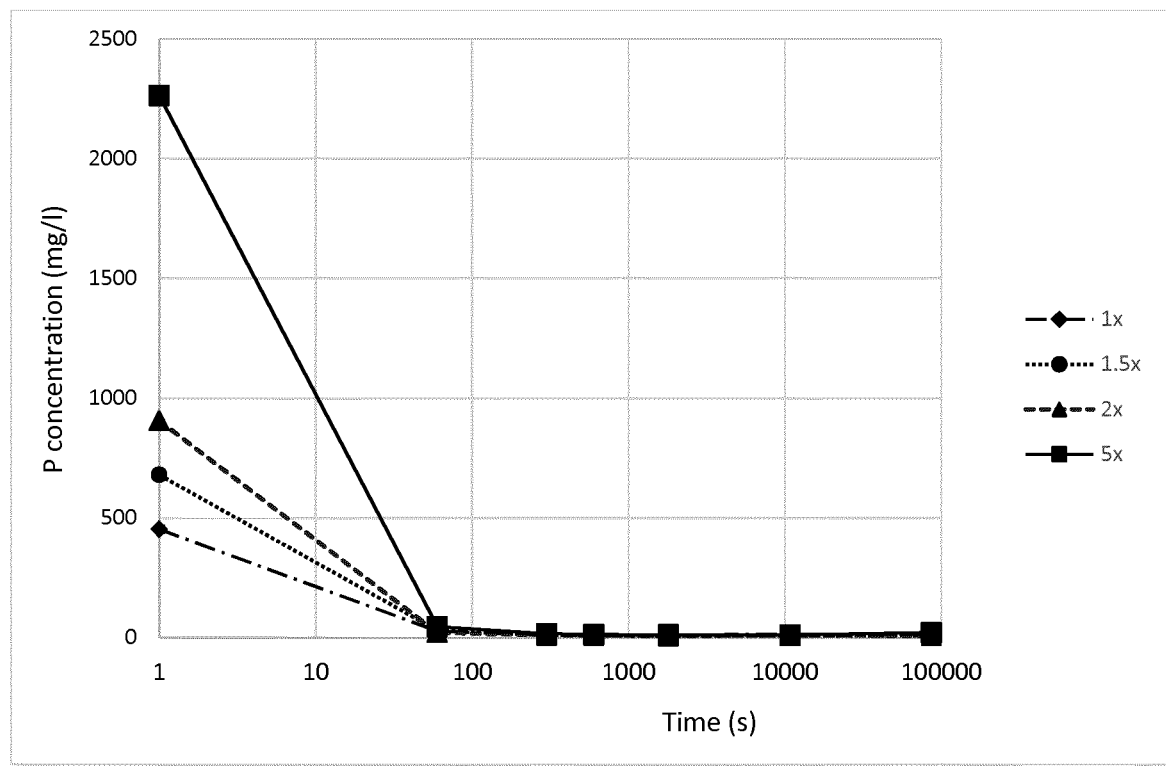
FIG. 8 illustrates a graph depicting the effect of concentrating the liquid waste stream on the precipitation of the dissolved phosphorus concentration ($PO_4$—P mg/L).

In FIG. 8 the lines are indicative of the liquid waste stream concentration; from a non-concentrated 1× medium (diamond—dashed/dotted line), to a slightly concentrated 1.5× medium (circle—dotted line); to a concentrated 2× medium (triangle—dashed line); up to a highly concentrated 5× times medium (square—full line). It can be observed that concentrating the liquid waste stream increases the speed at which phosphorus is precipitated in the K/P comprising compound, until saturation is reached.

Figure 9:
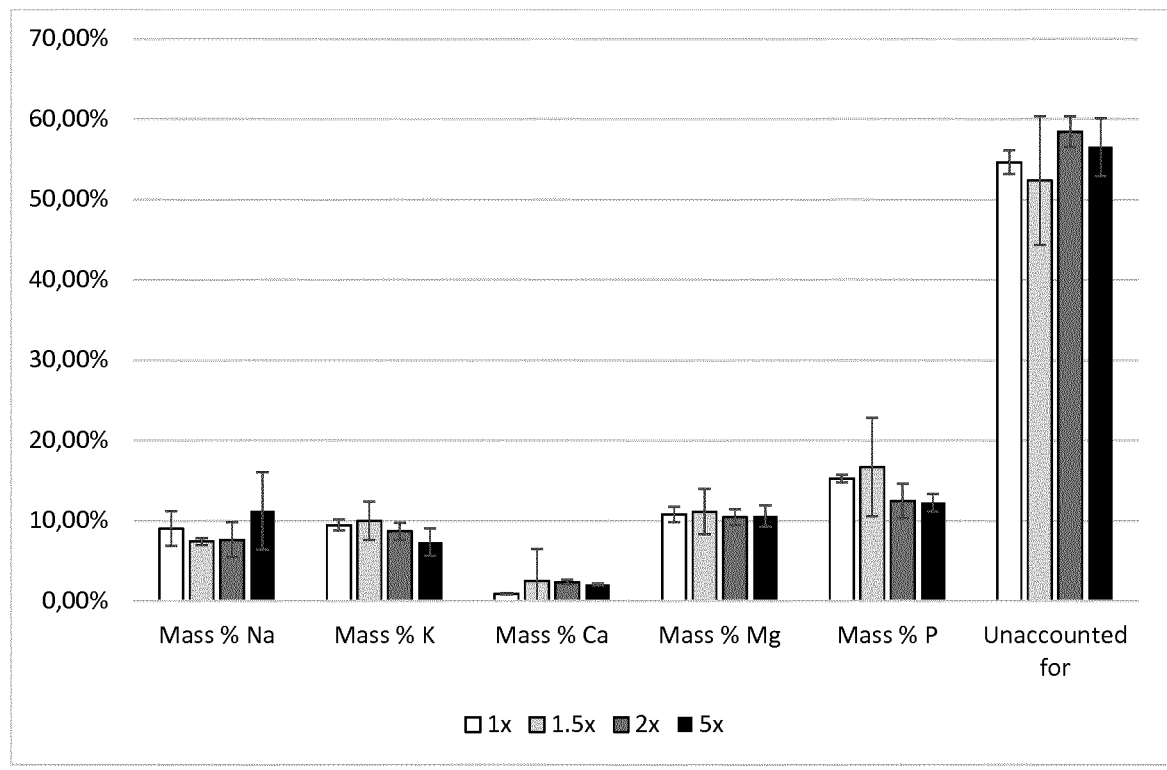
FIG. 9 illustrates a bar graph depicting the effect of concentrating the liquid waste stream on the product elemental composition (%).

In FIG. 9, the grayscale intensity increases with the concentration level; from a non-concentrated (white) up to the 5 times concentrated (black) medium. It can be seen that the overall elemental composition (%) of the K/P-comprising compound is not changed (significantly) during precipitation in a more concentrated medium.

In Table 1 the effect of concentrating the feed solution on the concentration factor during batch testing is shown. Concentrating the feed solution provides that proportionally more K/P comprising compound is precipitated per litre of (synthetic) urine than would be expected based on a linear trend from non-concentrated urine.

TABLE 1

|  | CF = 1 | CF = 1.5 | CF = 2 | CF = 5 |
| --- | --- | --- | --- | --- |
| Synthetic urine (g/l) | 3.8 | 6.1 | 8.3 | 23.7 |
| Real urine (g/l) | 2.1 | 2.8 | 4.0 | 10.2 |

Example 4: Importance of the Order of Steps

Regarding the essential chronology of the process, in which N removal needs to occur prior to the K-struvite precipitation: this can be shown by reversing the chronology, and providing the nucleation agent $Mg^{2+}$ to the N, P, and K-rich solution without prior N removal.

A similar methodology was applied to the previous experiments. For these experiments, a crystallization setup of beakers of 0.5 L was used, to which 0.5 L of urine (either stripped or hydrolyzed) was added. To this urine, a concentrated $MgCl_2$ solution or dry MgO was added, in equimolar amounts to the P content, after which the pH was adjusted (to a preferred pH of 10) to the desired value using a concentrated (6-10 M) NaOH solution. The beaker was stirred using a magnetic stirrer at a stirring speed of 100 rpm from the addition of the $Mg^{2+}$ nucleation compound to the end of the precipitation reaction (after 1 h). Crystalline material is removed from the urine liquid using a Whatman 602H filter (Whatman, USA).

Urine composition was determined using previously reported methods, being the Scheel method for P determination, an automated flow analyser using the nitroprusside method for N determination, and ICP-OES (Varian Vista, USA) for determination of major cations (Na, K, Ca, Mg). The urine composition prior to experiment is given below in Table 2.

TABLE 2

| Component (mg/L) | Without prior N removal | With prior N removal |
|---|---|---|
| K | 1929 | 1743.7 |
| Na | 1822 | 2338.5 |
| Mg | 0.81 | 0.0 |
| Ca | 12.7 | 5.6 |
| P | 312.8 | 264.3 |
| NH4—N | 1437 | 182.6 |

The results of the analysis regarding removal efficiency from the urine are shown in Table 3. Here, it can be seen that without sufficient N removal prior to the precipitation reaction, potassium cannot be adequately recovered. In this case, ammonium struvite is supersaturated to a higher degree than the potassium struvite, causing no potassium struvite to form.

TABLE 3

| Removal efficiency (% of recoverable concentration) | Potassium | Phosphorus |
|---|---|---|
| Without prior N removal | 1.5 ± 0.4 | 91.2 ± 3.3 |
| With prior N removal | 48.5 ± 6 | 93.9 ± 11 |

To further elucidate the composition of the precipitate formed in both of these experiments, to make a further comparison, the elemental composition of the precipitate is shown in Table 4. From this table, it is clear that indeed, N completely substitutes both K and Na in the crystal lattice of the struvite, ensuring that K recovery is very difficult indeed.

TABLE 4

| Composition precipitate | Total precipitate mass | K mass % | Na mass % | Mg mass % | Ca mass % | P mass % | N mass % |
|---|---|---|---|---|---|---|---|
| With prior N removal | 721.7 ± 109.6 | 11.44 ± 2.5 | 1.41 ± 2 | 19.97 ± 1.3 | 0.12 ± 0.10 | 17.54 ± 3.7 | 0.02 ± 0.01 |
| Without prior N removal | 1225.5 ± 20.2 | 0.25 ± 0.06 | 0.4 ± 0.2 | 8.56 ± 0.07 | 2.21 ± 0.05 | 11.64 ± 0.3 | 18.06 ± 5.7 |

If N is not removed prior to K/P precipitation, mainly ammonium-struvite is obtained. All P has reacted and K cannot be recovered anymore in a K/P compound.

Similarly, in pilot-scale experiments it was found that insufficient N removal prior to precipitation lowered K recovery, because ammonium struvite was formed instead of potassium struvite.

The invention claimed is:

1. Method for recovering Nitrogen (N), Potassium (K), and Phosphorus (P) from a liquid waste stream, wherein the liquid waste stream comprises N, K, and P, the method comprising the steps of: a. removing a Nitrogen (N)-comprising compound from the liquid waste stream, thereby obtaining a Nitrogen (N)-poor solution and the Nitrogen (N)-comprising compound; wherein during step a. the concentration of Nitrogen (N) in the Nitrogen (N)-poor solution is at most 100.0 mg/l, as measured using a Kjeldahl measurement method according to ISO 5663:1984; b. concentrating the Nitrogen (N)-poor solution through water removal, thereby obtaining a concentrated solution; wherein step b. is performed until the water removal is at least 50.0%; c. adding a nucleating agent to the concentrated solution; and, d. precipitating potassium struvite $MgKPO_4.6H_2O$ from the concentrated solution, thereby obtaining potassium struvite $MgKPO_4.6H_2O$ and a waste solution, wherein step a. and/or step b. is performed through membrane distillation and wherein in step d. no magnesium ammonium phosphate (ammonium struvite, MAP) is formed.

2. Method according to claim 1, wherein the liquid waste stream is a stream of urine, or is a stream comprising excreta, or is wastewater.

3. Method according to claim 1, wherein during step a. at least 80.0% of reduced Nitrogen (N), in which Nitrogen (N) has a negative oxidation state, is removed, with the % based on the total amount of Nitrogen (N) in the liquid waste stream as measured using the Kjeldahl measurement method according to ISO 5663:1984.

4. Method according to claim 1, wherein the pH of the liquid waste stream is at least 7 to at most 14.

5. Method according to claim 1, wherein during step a. the concentration of Nitrogen (N) in the Nitrogen (N)-poor solution is at most 75.0 mg/l.

6. Method according to claim 1, wherein the Nitrogen (N)-comprising compound is an organically bound Nitrogen (N)-compound.

7. Method according to claim 1, wherein step b. is performed until the concentrated solution contains a Phosphorus (P) concentration of at least 50 mg/l.

8. Method according to claim 1, wherein step b. is performed until the water removal is at least 50.0% and at most 99.0%; wherein 100.0% is the total amount of water present in the Nitrogen (N)-poor solution.

9. Method according to claim 1, wherein the nucleating agent is a Magnesium (Mg)-comprising compound or solution.

10. Method according to claim 1, wherein an average dosage speed of Magnesium (Mg) concentration added to the concentrated solution is adjusted to the Phosphorus (P) concentration in concentrated solution.

11. Method according to claim 1, wherein the Potassium to Phosphorus (K:P) molar ratio in the liquid waste stream is at least 0.5:1.

12. Method according to claim 1, wherein none of Nitrogen (N), Potassium (K), or Phosphorus (P) are added to the liquid waste stream prior to step a., and/or to the Nitrogen (N)-poor solution prior to step b., and/or to the concentrated solution prior to step c.

* * * * *